United States Patent

Dinelli et al.

[11] Patent Number: 5,958,814
[45] Date of Patent: Sep. 28, 1999

[54] COMPOSITE STRUCTURE COMPRISING A COMPONENT OF ELECTRO-CAST REFRACTORY AND ELEMENTS HIGHLY RESISTANT TO CORROSION AND EROSION

[75] Inventors: Giancarlo Dinelli, Mogliano Veneto; Alessandro Fantinel, Roveredo in Piano, both of Italy

[73] Assignee: Refel S.p.A., S. Vito Tagliamento, Italy

[21] Appl. No.: 08/750,585

[22] PCT Filed: Jun. 19, 1995

[86] PCT No.: PCT/EP95/02365

§ 371 Date: Dec. 18, 1996

§ 102(e) Date: Dec. 18, 1996

[87] PCT Pub. No.: WO95/35267

PCT Pub. Date: Dec. 28, 1995

[30] Foreign Application Priority Data

Jun. 20, 1994 [IT] Italy ................... MI94A1290

[51] Int. Cl.[6] ............................. C04B 35/109
[52] U.S. Cl. .................... 501/105; 501/107; 501/115; 501/128; 52/596; 266/270; 264/332
[58] Field of Search ....................... 501/105, 106, 501/128, 115, 107; 266/270, 280, 282, 283, 286; 52/596; 165/9.1; 264/332

[56] References Cited

U.S. PATENT DOCUMENTS

| | | |
|---|---|---|
| 3,239,972 | 3/1966 | Hosbein et al. . |
| 3,390,505 | 7/1968 | Dockery . |
| 4,294,795 | 10/1981 | Haga et al. ................ 264/332 |
| 4,910,174 | 3/1990 | Bert et al. ................ 501/105 |
| 5,028,572 | 7/1991 | Kim et al. ................ 501/127 |
| 5,053,366 | 10/1991 | Schoenahl ................ 501/127 |
| 5,127,463 | 7/1992 | Hirata et al. ................ 165/9.1 |
| 5,212,123 | 5/1993 | Schoennahl ................ 501/87 |
| 5,733,830 | 3/1998 | Endo et al. ................ 501/127 |

FOREIGN PATENT DOCUMENTS

| | | |
|---|---|---|
| A 624097 | 2/1963 | Belgium . |
| A 0008261 | 2/1980 | European Pat. Off. . |
| A 0060691 | 9/1982 | European Pat. Off. . |
| 405319912 | 12/1993 | Japan . |
| 1325057 | 8/1973 | United Kingdom . |

OTHER PUBLICATIONS

"Electrocast Refractories for the Structure & Crown of flame fired glass tanks" Horvath, Epitoanyag (1991), 43(5), 188–194.

*Primary Examiner*—Paul Marcantoni
*Attorney, Agent, or Firm*—Guido Modiano; Albert Josif

[57] ABSTRACT

A composite and monolithic refractory structure, particularly adapted for making furnaces for glassmaking or the like, constituted by a block-shaped component made of electro-cast refractory material based on oxides of aluminum, zirconium, silicon, and the like, having shapes and dimensions that are adapted for its uses, inside which at least one protective element is monolithically inserted; the protective element is highly resistant to the attack of molten glass baths or the like and is chosen among metals, noble metals, refractory metals, refractory materials, conventional and non-conventional ceramic materials, such as carbides, nitrides, borides, and the like, or graphite-based materials, alloys and/or compounds and/or composites thereof; the element is provided substantially in the shape of a plate that is shaped and sized so as to have a profile that is similar to the peripheral profile of the refractory block and is arranged, inside the block, so that its surfaces are located at, and proximate to, the surfaces of the block that are meant to be exposed to the attack of the bath, so as to constitute an insert that acts as a continuous protective barrier against the attack for the refractory component. The scope of the invention also includes a process for producing the composite refractory structure in conventional molds.

13 Claims, 6 Drawing Sheets

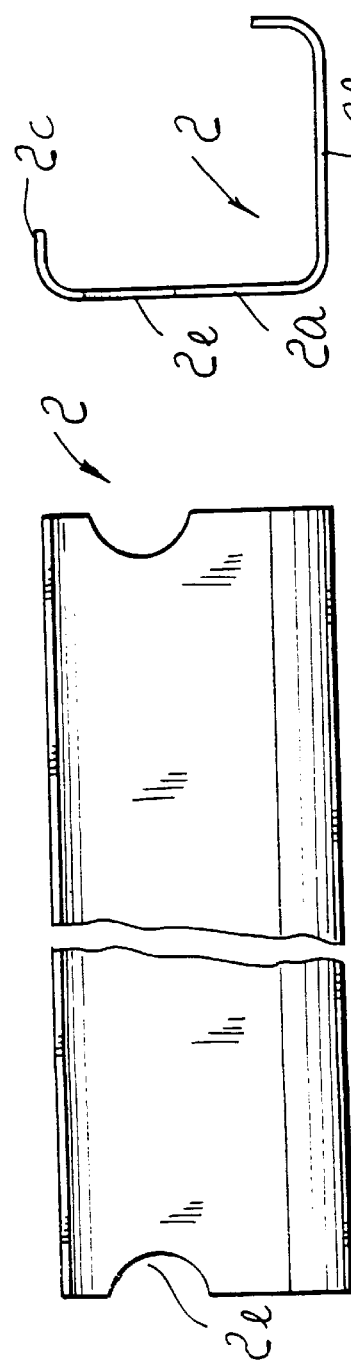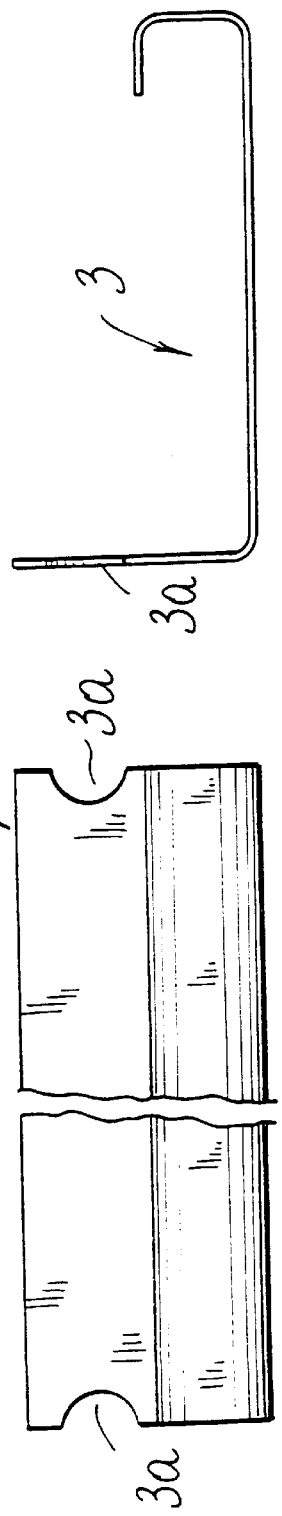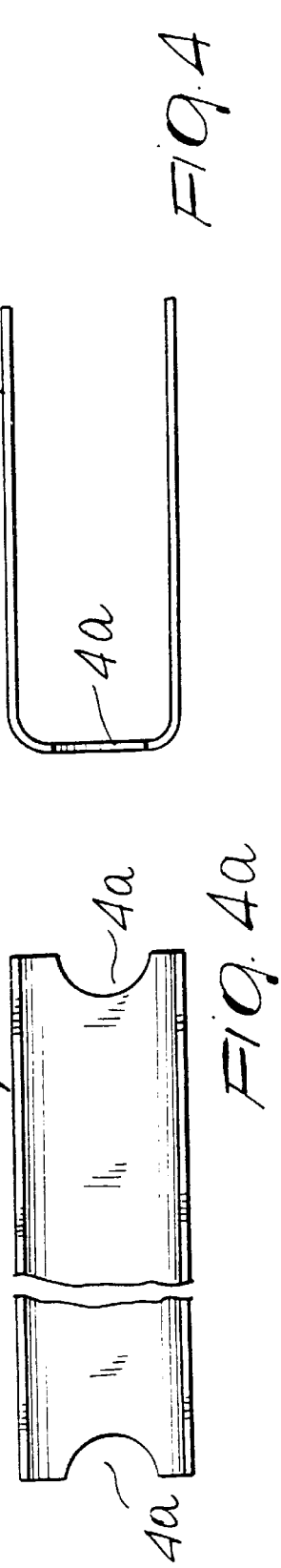

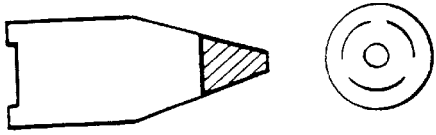
Fig. 6 BIS
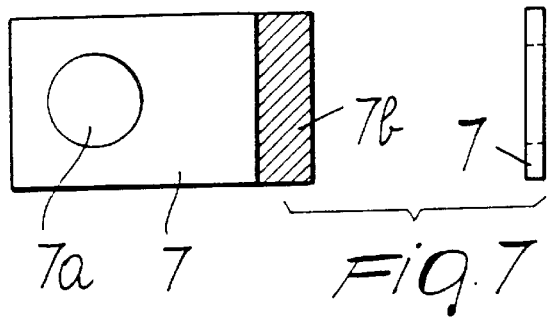
Fig. 7
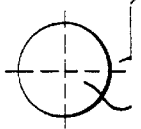
Fig. 6
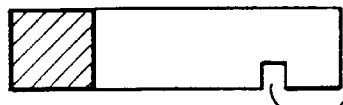 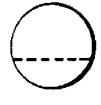
Fig. 8a   Fig. 8
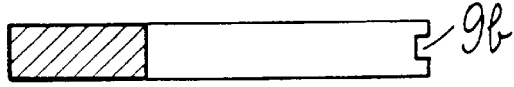 
Fig. 9a   Fig. 9
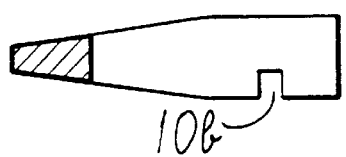 
Fig. 10a   Fig. 10
 
Fig. 11a   Fig. 11

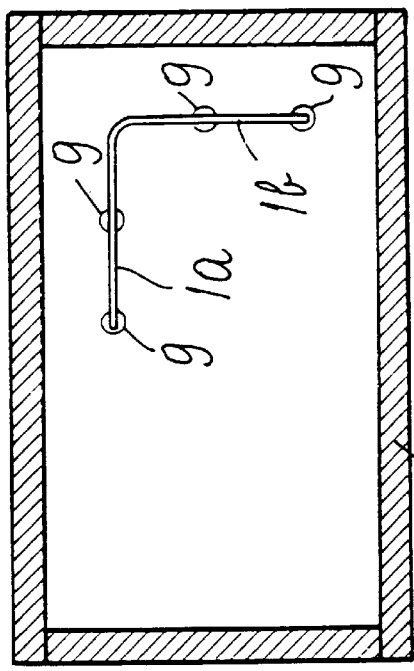
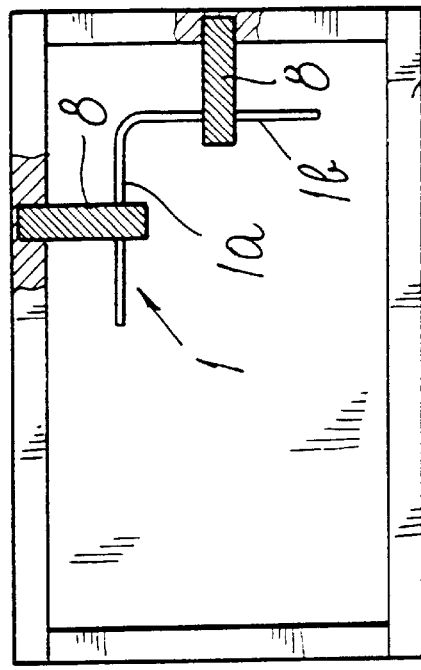
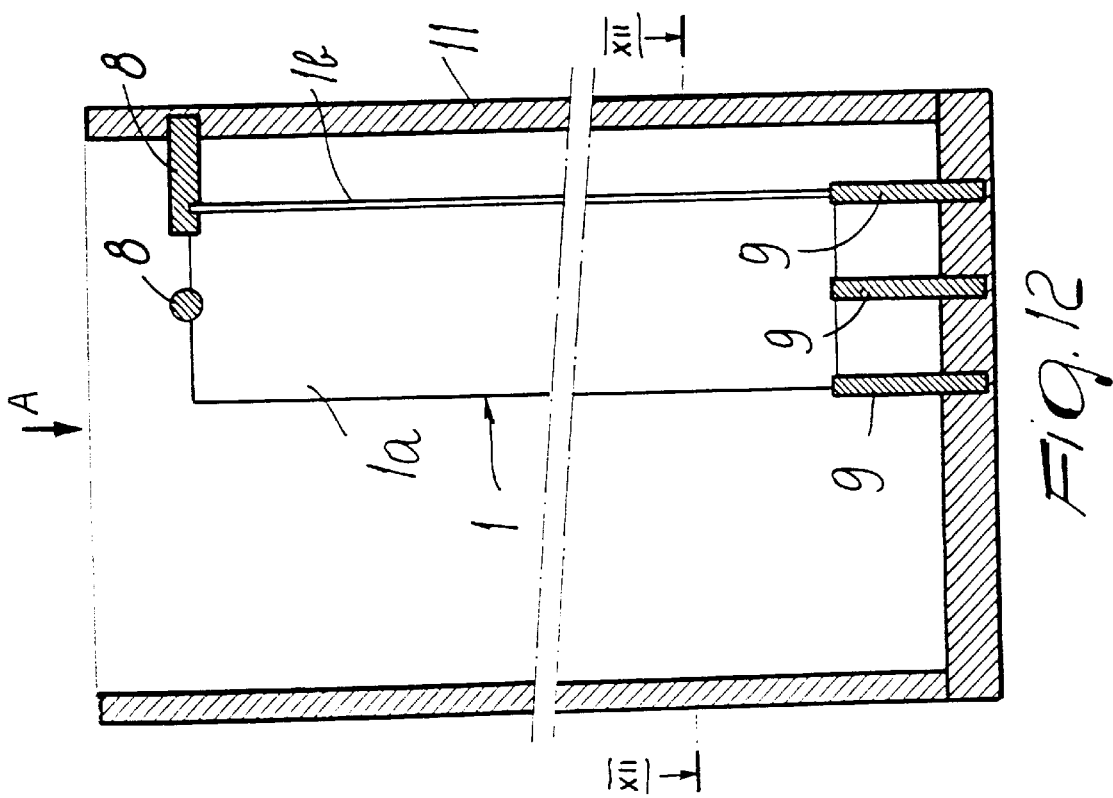

COMPOSITE STRUCTURE COMPRISING A COMPONENT OF ELECTRO-CAST REFRACTORY AND ELEMENTS HIGHLY RESISTANT TO CORROSION AND EROSION

BACKGROUND OF THE INVENTION

The present invention relates to a composite refractory structure constituted by an electro-cast refractory component based on ceramic oxides, refractories and other materials, and mineral oxides, which includes at least one variously shaped structural element that is highly resistant to corrosion and/or erosion produced by molten baths and in particular by baths of molten glass and the like.

The scope of the present invention also includes a process for producing said monolithic composite refractory structure, which can be used to make furnaces for glass-making and particularly in the regions of the furnace that are most intensely subjected to the corrosive action of molten glass.

It is known that the technology for building glassmaking furnaces uses appropriately assembled monolithic elements made of electro-cast refractory material which are usually termed "electro-cast blocks".

These electro-cast blocks are produced in various shapes, sizes, kinds, and qualities, and are all obtained by casting a mixture of molten refractory oxides in a three-phase electric-arc furnace, as disclosed in Italian patent Application 19461 A/87 of Feb. 23, 1987.

The molten mixture is cast into appropriately designed and shaped molds, where it undergoes a first partial cooling and assumes the intended shape. The electro-cast refractory material then completes its cooling cycle in controlled conditions; at the end of this cycle, it is usually machined and finished mechanically.

This final product is commonly termed "electro-cast refractory block".

It is also known that the electro-cast refractory material is attacked during use, as a consequence of the various mechanical, physical, and chemical conditions that occur in each part of the furnace.

The attack to which the electro-cast refractory is subjected wears it away. The extent of the wear determines the duty life of the blocks of electro-cast material and substantially determines the duty life of the glass furnace.

The wear of blocks of electro-cast material is different according to their quality, type, and location in the furnace. In fact, it is known that there are areas in the furnace where wear is more intense than in others. It is widely acknowledged that among the most intense wear which occurs, there is the wear in the electro-cast blocks that compose the throat of the furnace, in particular the throat cover block at the glass inlet, the weir wall, or in the area of the blocks that is technically defined as "flux line" or "metal line".

In order to extend the life of a glass furnace as much as possible, good practice selects and assembles together electro-cast refractories having different qualities and properties in order to balance the extent of wear in every part of the furnace.

In the production of glass furnaces it is in fact now common to simultaneously have blocks of electro-cast refractory having different chemical compositions ($Al_2O_3$—$ZrO_2$—$SiO_2$, alpha and beta $Al_2O_3$, $ZrO_2$, $Al_2O_3$—$Cr_2O_3$—$SiO_2$—$ZrO_2$, etcetera), located in specific areas depending on the quality and type of glass produced and on the stresses that they must withstand.

In the known art, despite using different materials, a satisfactory balance between the wear of the various regions of the glass furnace has not yet been achieved, and therefore the optimum life of said furnace is still not achieved due to the early wear of some parts thereof.

In order to reduce the effects of this disparity in wear and ensure the maximum operating life of the furnace, one generally resorts to other solutions of a mechanical type, such as cooling the structure from outside, or to repairs of the most intensely worn regions while the furnace is hot and running. Known from EP-A-008261 is a refractory block, for steel furnaces, having a rectangular cross-section and a metal or graphite insert. The insert has an X-shaped cross-section extending along the diagonals of the rectangular cross-section of the refractory block, for facilitating cooling and thereby prolonging the working life of the block. However, the block is not designed for prolonged contact with molten material and has no means for preventing excessive wear of the block upon coming into contact with molten material.

SUMMARY OF THE INVENTION

Accordingly, the aim of the present invention is to provide a composite and monolithic refractory structure that is shaped like an electro-cast refractory block having various dimensions and chemical-physical characteristics which has, during use, a high resistance to corrosion/erosion produced by molten baths and particularly by baths of molten glass, and therefore a life that is far longer than that normally achieved with electro-cast materials of any kind and composition.

An object of the invention is to provide a composite refractory structure conceived and provided so as to be constituted by components that are chemically and/or physically different from each other and are in intimate and continuous contact with each other, one component being constituted by refractory material that has been electro-cast or melt or fused with other methods, and one or more parts being constituted by a material that is highly resistant to high temperatures and to corrosion and is capable of constituting an effective protective barrier for the refractory component against the continuous attack of a bath of molten glass or the like.

Another object of the invention is to provide a method for manufacturing said composite refractory structure conceived so as to be easy to perform and highly effective without requiring particular and expensive equipment for performing it.

This aim, these objects, and others which will become apparent from the following description are achieved by a composite and monolithic refractory structure as defined in the appended claims.

Also according to the invention, a method is provided for the production of said composite refractory structure as defined in the appended claims.

BRIEF DESCRIPTION OF THE DRAWINGS

Further characteristics and advantages of the present invention will become apparent from the following detailed description, given with reference to the accompanying drawings, which are provided only by way of non-limitative example and wherein:

FIGS. 2 and 2*a* are a side view and a front view of a metallic plate-like insert;

FIGS. 3 and 3*a* are a side view and a front view of another insert shaped like a metallic lamina;

FIGS. 4 and 4*a* are a side view and a front view of a laminar insert that substantially has a U-shaped profile;

FIG. 6 is a view of an insert constituted by a solid cylindrical bar;

FIGS. 6 bis to 11*a* are views of a series of elements for supporting and/or suspending an insert (shown in the previous figures) inside a mold; said elements can be made of metal, graphite, or refractory or ceramic material, or of other adapted materials in various dimensions and shapes;

FIG. 12 is a median sectional view of a conventional mold for producing a block of electro-cast refractory material, inside which an L-shaped metallic laminar insert is positioned by using supporting elements chosen among those shown in FIGS. 6 bis to 11*a*;

FIGS. 12*a* and 12*b* are respectively a transverse sectional view of the mold, taken along the plane XII—XII of FIG. 12, and a view of FIG. 12 taken from "A";

DESCRIPTION OF THE PREFERRED EMBODIMENTS

With reference to the above figures and to the preceding description, the composite refractory structure according to the present invention is substantially constituted by a monolithic component made of refractory material that is electro-cast (or cast with other methods), is based on ceramic oxides, particularly oxides of the AZS system (i.e., oxides of aluminium, zirconium, silicon), and includes at least one metallic insert that is fully immersed so as to be concealed, said insert acting as a barrier for protecting the refractory material from the attack of the molten glass or similar corrosive product.

Depending on the type of block of electro-cast material and most of all on its relative position in the structure that composes a furnace for molten glass, metal inserts such as for example those shown in FIGS. 1 to 6 or any other adapted shape are used, and various kinds of support, such as for example those shown in FIGS. 6 bis to 11*a*, or similar ones, are used to support said inserts inside a mold for an electro-cast block.

Thus, for example, a first type of insert is constituted by a rectangular metallic lamina (FIGS. 1, 1*a*, 1*b*) that is folded so as to be L-shaped and have two identical (or optionally different) wings 1*a*, 1*b* along a preset radius of curvature R; at the opposite ends, for example, of the wing 1*a*, there is a recess or notch 2 that is semicircular (or has another kind of profile) and is meant to interrupt the continuity of the insert external perimeter.

Likewise, the metallic insert of FIG. 2 is also constituted by a metallic lamina 2 that is folded so as to be L-shaped and form the two wings 2*a* and 2*b*. The wing 2*a* ends with a part 2*c* that is folded at an angle and is provided with a semicircular recess 2*e*. The wing 2*b* also ends with a portion that is folded like the portion 2*c*.

Figure 5:
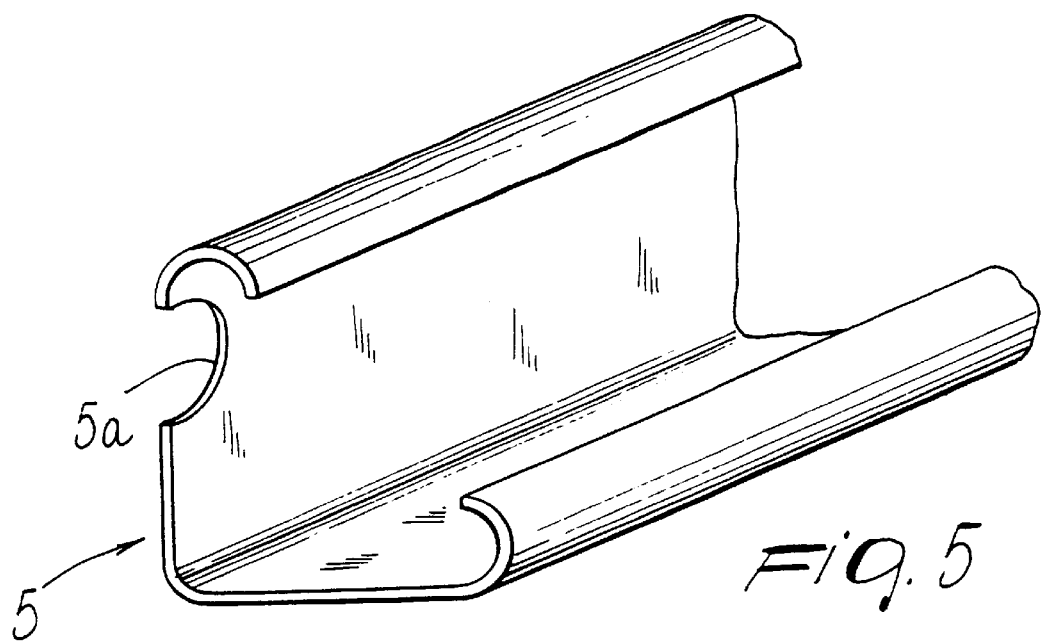
FIGS. 5, 5*b*, 5*a* are respectively a perspective view, a front view, and a side view of another laminar insert folded so as to be L-shaped.
Figure 5B:
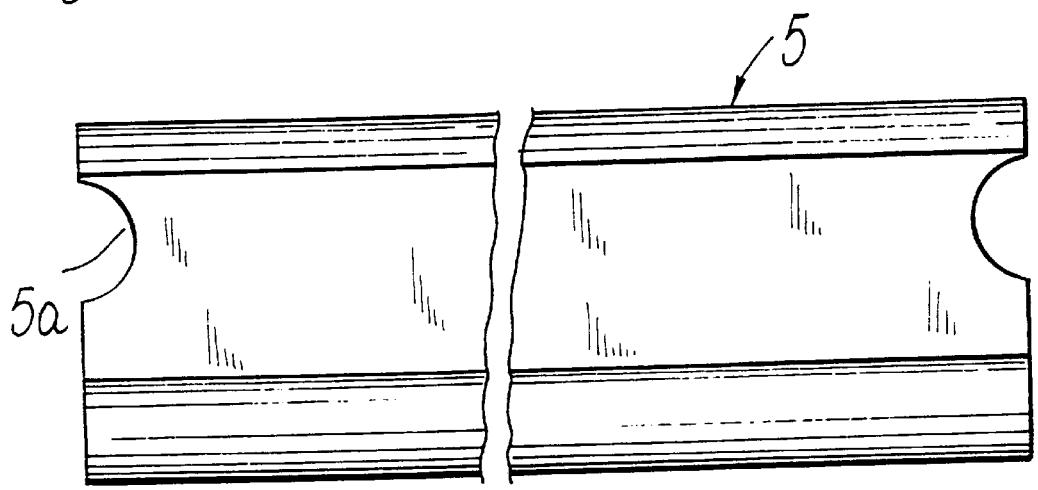
Figure 5A:
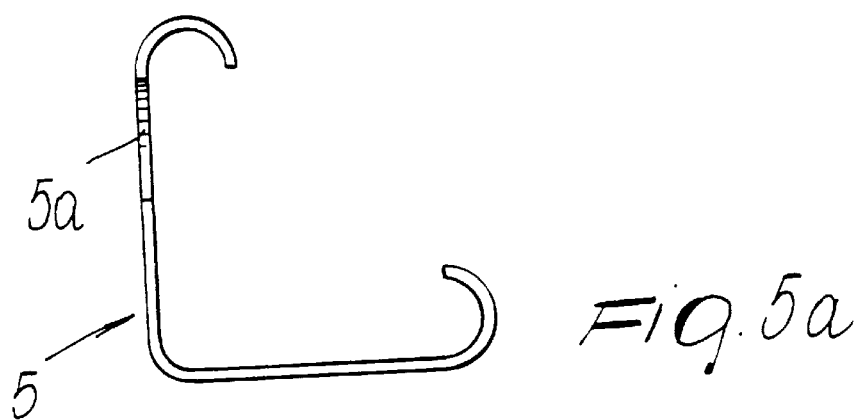

Likewise, the inserts of FIGS. 3, 4, and 5 are constituted by a metallic plate that is folded so as to be L-shaped or U-shaped, are respectively designated by the reference numerals 3, 4, and 5, and are also provided with a recess 3*a*, 4*a*, and 5*a*.

Only the ends of the insert 4 are not folded.

Said inserts are generally constituted by metals such as Mo, Pt, Ta, W, and the like; they can also be constituted by materials including, for example, ceramic materials, graphite, carbides, nitrides, borides, suicides, and other similar materials, both as such and as alloys or compounds and/or composites thereof. They can also be treated by means of chemical, physical, or mechanical processes to adapt them to the operating requirements; likewise, their dimensions in length, width, and thickness can vary according to the dimensions of the block for which said inserts must constitute the protective barrier.

The shape of said inserts reproduces the peripheral shape of the part of the block that is protected against the attack of the molten glass bath.

Various kinds of supporting elements, such as those shown by way of example in FIGS. 6 bis to 11*a*, are used to stably position the various inserts inside the mold.

Thus, for example, FIGS. 6 bis and 7 illustrate dowels or pins made of metal, graphite, refractory or ceramic materials, or other adapted material, that can be used to position the insert of FIG. 6, constituted by a solid cylindrical bar, inside the mold.

The narrower end of the pin of FIG. 6 bis is inserted in the wall of the mold, whereas one end of the cylindrical bar-shaped insert of FIG. 6 is arranged in the seat of the protruding part having a larger diameter. The support of FIG. 7 is substantially constituted by a plate 7 made of metal or other material which is provided with an adapted hole 7*a*, in which the free end of the cylindrical bar-shaped insert is inserted; the part 7*b* shown in dashed lines is instead inserted snugly in the wall of the mold. FIGS. 8 to 11*a* illustrate other supports having a cylindrical or frustum-like shape and provided with laterally formed notches 8*b* and 10*b* or with recesses 9*b* and 11*b* that are formed at their ends. Said recesses or notches are meant to snugly accommodate the edge of the wings of the various laminar inserts so as to position them stably.

FIGS. 12, 12*a* and 12*b* illustrate a complete example of the positioning of an insert inside a mold which is shaped like a rectangular parallelepiped, shown in FIG. 12, prior to the casting of the molten refractory.

Figure 1:
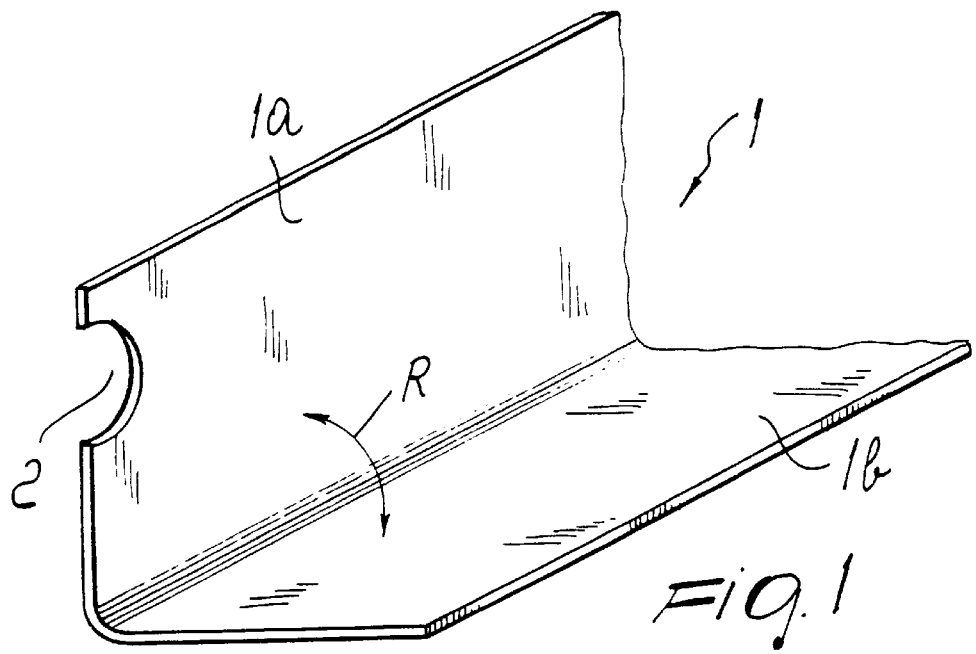
FIGS. 1,1*b* and 1*a* are respectively a perspective view, a front view, and a side view of a type of metallic insert that is shaped like a metallic lamina with an L-shaped profile.
Figure 1B:
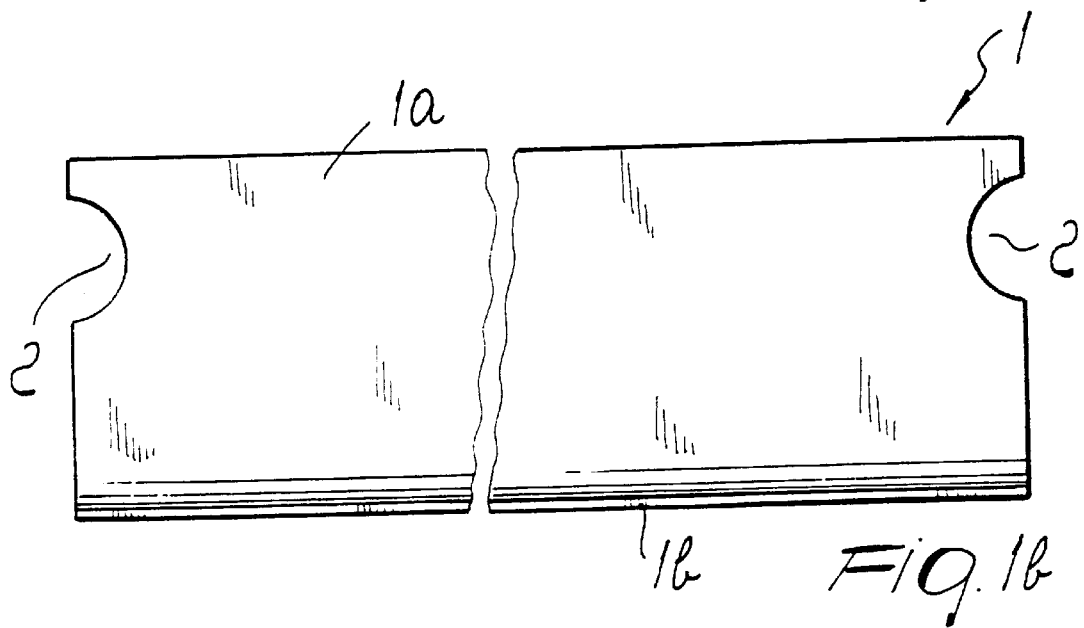
Figure 1A:
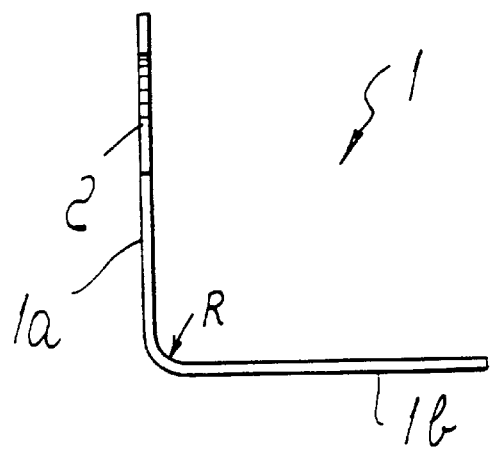

The insert arranged therein is of the type of the one designated by the reference numeral 1 in FIG. 1, that is to say, a lamina with an L-shaped profile and with wings 1*a* and 1*b* vertically arranged. The lower edge of the wing 1*a* is accommodated in the recess 9*b* of two vertical cylindrical supports 9 (FIG. 9), in which the ends that lie opposite to the one provided with the recess are inserted snugly in the back wall of the mold 12; the wing 1*b* is likewise arranged on two identical supports 9 which are also snugly inserted in the back wall of the mold, as shown by the sectional view of FIG. 12*a*. Said wings 1*a* and 1*b* are furthermore retained at the top of the mold by means of two cylindrical elements 8 that are horizontally inserted snugly in the contiguous walls of the mold (FIG. 12*b*).

The arrangement of the wings of the insert 1 is such as to allow said insert to remain fully contained inside the mold and thus also inside the finished refractory block, and is also such as to keep its wings stably parallel and close to the inside surfaces of the mold walls.

Of course, the other kinds of support can be used to position and support the other kinds of insert, such as those shown merely by way of example in the accompanying figures.

The method for casting the molten refractory material inside the mold to achieve the composite structure according to the invention therefore entails the following operating steps:

positioning, supporting, and/or suspending at least one insert inside the casting mold with the aid of said appropriately structured and configured supporting elements, so that said insert is fully immersed in the part made of electro-cast refractory so that the surfaces that must constitute the barrier against the attack of the molten glass bath are located at, and proximate to, the surfaces of the block that will be exposed to said attack;

casting the molten refractory material inside the mold with an appropriate method and equipment ensuring control of the flow-rate and of the adequate directionality of the casting flow, in order to introduce the molten material in the planned time, prevent relative movements of the insert or inserts with respect to the mold, and thus achieve uniform and complete filling of said mold.

The importance of choosing the materials constituting the elements that position and support the insert or inserts, their shape, and their dimensions, is evident during this step.

The definition of these correlated characteristics must be performed in accordance with the nature of the insert and of the refractory part and is essential to:

prevent, during casting, the elements from undergoing an alteration of any nature that might cause a movement of the insert from its original planned position;

produce permanent structural continuity between the elements and the refractory part of the composite structure after the block has cooled; and produce permanent, intimate, and mutual contact without discontinuities between the elements and the insert at their interface after the block has cooled.

It is furthermore necessary to cool the composite structure constituted by the refractory part and by the insert according to an appropriate thermal cycle, so as to ensure the formation of a uniform microcrystalline structure of the refractory part and permanent intimate contact between said refractory part and the insert.

For this purpose, it is indispensable that the choice of the nature of the refractory part, of the insert, and of the supports be such that they have a consistent expansion behavior.

Figure 13:
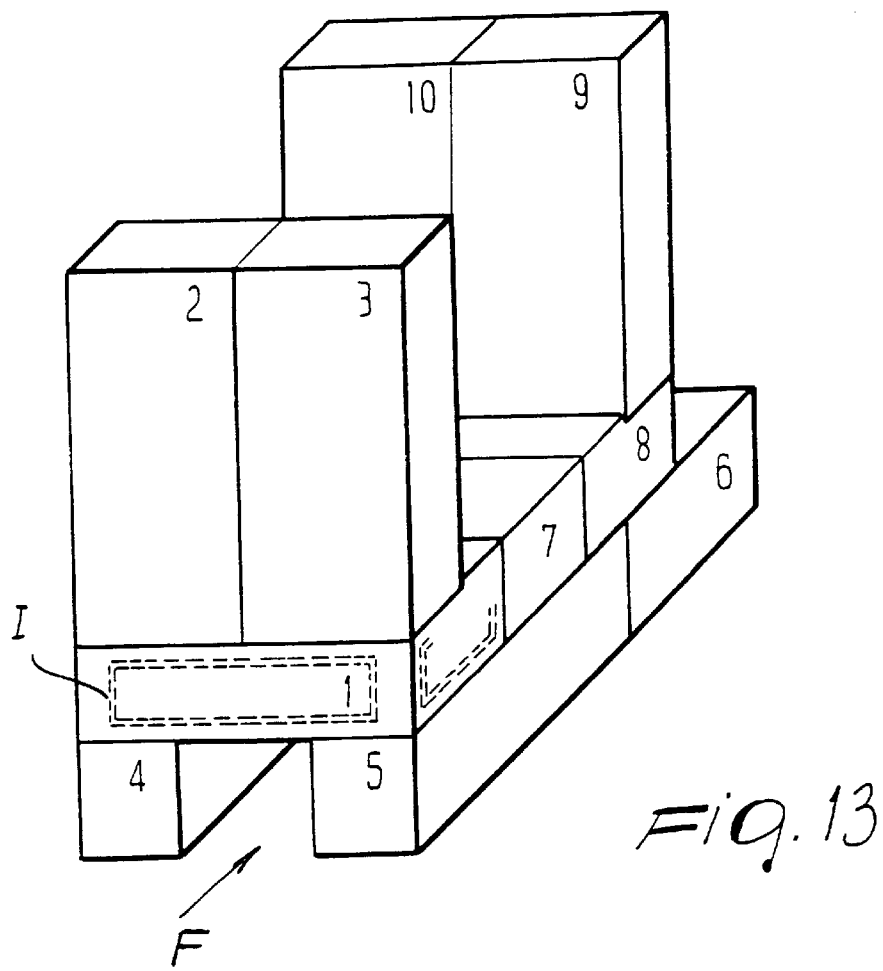
FIG. 13 is instead a schematic view of an example of use of the composite structures provided according to the invention, and more precisely of a shape of the glass flow region, termed "throat", and of the direction (F) of the molten glass flow from the melting tank to the working end.

The block produced according to the described method can be used for example for each one of the positions numbered 1 to 9 of FIG. 13. Said FIG. 13 illustrates one of the possible embodiments of the region of the glass furnace technically termed "throat".

Intense corrosion of the electro-cast refractory material occurs in this region and mostly affects the blocks in positions 1, 2, and 3, and particularly the block in position 1, which is the most critical element, also from the point of view of its structural function in the throat of FIG. 13.

Figure 14:
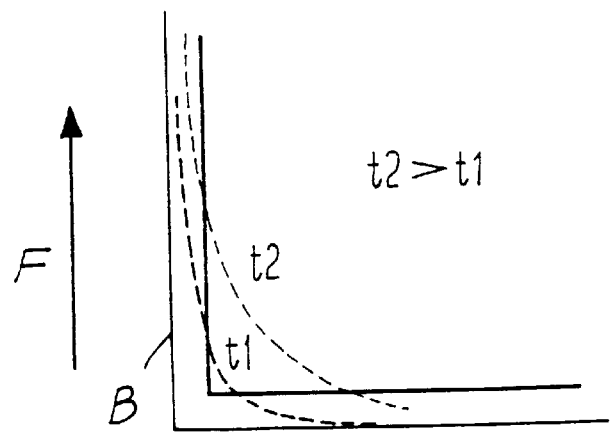
FIG. 14 is a time-based plot of the corrosion of a block and more precisely of the progressive corrosion profile compared with the initial profile of the refractory block.

The throat is an essential element of the structure of the furnace, and its wear in practice determines the duty life of said furnace, sometimes entailing an early shutdown. Corrosion of the blocks that constitute the throat occurs according to the typical profile shown in FIG. 14, where F designates the direction of the flow of molten glass, B designates the profile of the initial block, and $t_1$ and $t_2$ designate the progressive corrosion profiles in the times $t_1$ and $t_2$, where $t_2$ is subsequent to $t_1$.

The insert I, shown in dashed lines inside the block in position 1, by interposing itself between the molten glass bath and the refractory material, acts as a protective barrier for the refractory body, preventing said body from making contact with the molten glass, thus avoiding its corrosion and/or erosion and in practice increasing the working life of the block.

The invention as described and illustrated according to some preferred embodiments is of course susceptible, in its practical execution, of further structurally and functionally equivalent modifications and variations, especially in the molten refractory materials, in the inserts, and in the supports, as well as in the number and relative position of said inserts and supports, without abandoning the scope of the protection of the invention.

What is claimed is:

1. Composite and monolithic refractory structure, for making furnaces for glassmaking, comprising:

a block-shaped component made of AZS electro-cast refractory material, said block-shaped component having at least one molten glass bath contacting external surface;

at least one protective element embedded inside said block-shaped component and resistant to the attack of molten glass baths, said protective element having substantially a shape of a continuous plate having a major extending surface which is located proximate to, and substantially parallel to, said molten glass bath contacting external surface of said block-shaped component whereby to constitute a continuous protective barrier against said attack of molten glass for the remainder of the AZS electro-cast refractory material located behind said protective layer opposite to said molten glass bath contacting external surface.

2. Refractory structure according to claim 1, wherein said protective element is made of at least one metal, selected from the group consisting of molybdenum, tantalum, tungsten, and platinum.

3. Method for producing a monolithic composite refractory structure, comprising the steps of:

preparing a mold for the production of a block of AZS electro-cast refractory material;

preparing at least one protective insert that is resistant to the attack of molten glass and having substantially a shape of a continuous plate with a major extending surface;

positioning, inside said mold, said protective insert so that said major extending surface of said protective insert is located proximate to and substantially parallel to a wall portion of said mold;

casting molten AZS electro-cast refractory material into said mold so as to surround said protective insert with said molten AZS electro-cast refractory material arranged inside said mold between said major extending surface of said protective insert and said wall portion of said mold and behind said protective insert with respect to said wall portion of said mold; and stopping the casting when the mold is filled and then cooling the molten AZS electro-cast refractory material in said mold surrounding the protective insert so as to form a monolithic composite refractory structure having said protective insert embedded inside solidified AZS electro-cast refractory material and having a molten glass bath contacting external surface formed from the AZS electro-cast refractory material which was arranged inside said mold between said major extending surface of said protective insert and said wall portion of said mold in said casting step such that said molten glass bath contacting external surface is located proximate to and substantially parallel to said major extending surface of said protective insert whereby said protective insert constitutes a continuous protective barrier against attack of molten glass for the remainder of the AZS electro-cast refractory material located behind said protective insert opposite to said molten glass bath contacting external surface.

4. Method according to claim 3, wherein said casting step comprises casting of refractory material that are meltable electrically and are selected from the group consisting of $Al_2O_3$, $SiO_2$, $ZrO_2$, $Cr_2O_3$, and $MgO$.

5. Method according to claim 4, wherein said preparing step comprises preparing said protective insert made of at least one metal selected from the group consisting of Mo, Pt, Ta, and W.

6. Refractory structure according to claim 1 wherein said protective element has at least two wings substantially extending mutually perpendicularly.

7. Refractory structure according to claim 1 wherein said protective element has bent and curled edges.

8. Refractory structure according to claim 1 wherein said protective element has at least one edge provided with a recess for engagement with a pin-shaped support for facilitating a stable positioning of said protective element inside a mold for casting AZS electro-cast refractory material for forming said block-shaped component made of AZS electro-cast refractory material and having said protective element embedded therein.

9. Method according to claim 3 wherein said preparing step comprises preparing said protective insert having at least two wings substantially extending mutually perpendicularly.

10. Method according to claim 3 wherein said preparing step comprises preparing said protective insert having bent and curled edges.

11. Method according to claim 3 wherein said positioning step comprises connecting pin-shaped supports inside said mold and wherein said preparing step comprises preparing said protective insert having at least one edge provided with a recess for engagement with said pin-shaped supports for facilitating a stable positioning of said protective insert inside said mold.

12. Method according to claim 11 wherein said position step comprises providing at least some of said pin-shaped supports with end grooves and positioning said protective insert in said mold such that edges of said protective insert are inserted in said end grooves.

13. Method according to claim 12, wherein said preparing and casting steps comprise selecting materials for said protective insert, for said AZS electro-cast refractory material, and for said supporting elements which have similar thermal expansion characteristics.

\* \* \* \* \*